Aug. 11, 1970  J. A. HOLCOMBE  3,523,696
SKID CONTROL DEVICE
Filed May 23, 1968
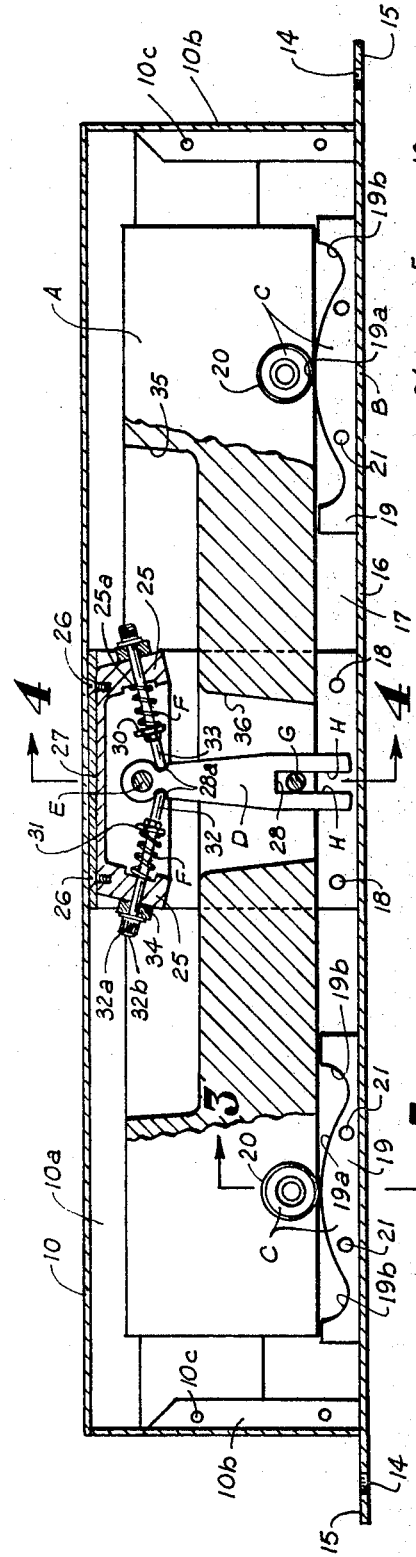
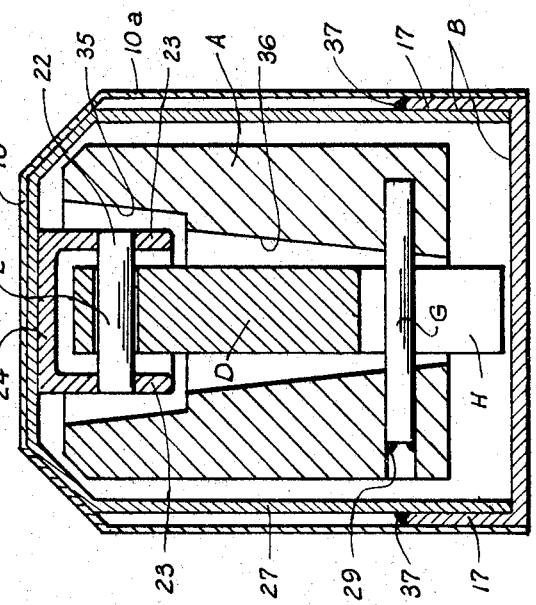
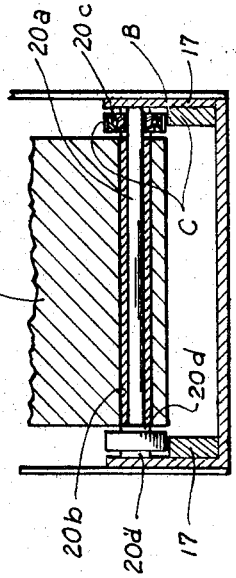
INVENTOR.
JAMES A. HOLCOMBE
BY
*Bailey & Hardy*
ATTORNEYS United States Patent Office 3,523,696
Patented Aug. 11, 1970

3,523,696
SKID CONTROL DEVICE
James A. Holcombe, Rte. 3, Easley, S.C. 29640
Filed May 23, 1968, Ser. No. 731,528
Int. Cl. B60m 27/00
U.S. Cl. 280—150                     5 Claims

ABSTRACT OF THE DISCLOSURE

A skid control device having cam means for controlling the vertical displacement and horizontal movement of the stabilizing weight has a link pivotally connected to the support on one end with sliding engagement on the other end with respect to a fixed element carried by the weight so as to increase horizontal movement and vertical displacement of the weight. The link may be positioned in the medial portion of the weight with the cam means supporting each end of the weight. The cam followers are resiliently mounted, and a U-shaped brace has legs with respective free ends fixed to the support so as to encompass said weight and carry spring means for returning the lever arm to an equilibrium position.

---

This invention relates to an improved skid control device which makes possible greater vertical displacement and horizontal movement of the weight accordingly, increasing its effectiveness.

Devices have long been known for stabilizing and skid controlling of vehicles, such as automobiles. While such devices are thought to be useful on vehicles of all types, the present invention will be discussed in the context of use on an automobile. Such devices counteract skidding, stabilize the automobile, increase traction, reduce tire wear, reduce vibration, and make for quicker stopping. This is accomplished by horizontal and vertical movement of a weight positioned in an automobile adjacent the rear bumper. The movement of the weight, which occurs as a result of movement of the automobile, tends to stabilize the automobile and reduce skidding in a manner which is well-known to those skilled in the art.

Prior art devices, such as that illustrated in United States Letters Pat. No. 2,990,193, issued June 27, 1961, in the name of Edward C. Heard employ vertical links pivotally connected on one end to the weight and pivotally connected on the other end to the support. Thus, vertical and horizontal displacement was limited to that afforded by the arc described by movement of the link as confined by the pivots at each end. Prior art devices made no provision for a cushioning on the weight supporting means when encountering bumps as on a road. Movement of the weight in prior art devices was often restricted due to luggage causing misalignment or mashing in the covers of the skid control devices.

Accordingly, it is an important object of this invention to provide an improved means for controlling the vertical displacement and horizontal movement of the weight of a skid control device.

Another important object of the invention is to provide an improved arrangement whereby opposed springs act through an effective length of lever arm which is greater than that normally afforded, tending to return the weight to equilibrium position.

Still another important object of the invention is to provide an improved supporting structure for the weight which is more stable and possesses longer useful life.

Another object of the invention is the provision of a rigid central brace element capable of effectively protecting the enclosure and weight from fouling due to the crushing action of luggage and the like.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a schematic rear elevation of an automobile having a skid control device constructed in accordance with the present invention mounted thereon, FIG. 2 is an enlarged longitudinal sectional elevation, with parts broken away, further illustrating a skid control device in accordance with the invention, FIG. 3 is an enlarged transverse sectional elevation taken on the line 3—3 in FIG. 2, and FIG. 4 is a transverse sectional elevation taken on the line 4—4 in FIG. 2.

The drawing illustrates a skid control device for a vehicle having a weight A mounted for vertical displacement and for horizontal movement transverse to the longitudinal axis of the vehicle. The device includes a support B for carrying said weight in attachment to the vehicle. Cam means C includes a cam and a cam follower, one of which has connection to the support B, and the other of which has connection to the weight A. Thus, the vertical displacement and horizontal movement of the weight A are governed by the configuration of the cam means C. A link D has a pivotal connection E, adjacent one end of the links, fixed against vertical displacement and horizontal movement with respect to the support. Opposed spring means F are carried by the support and normally urge the link to an intermediate, equilibrium position. An element G is carried in fixed position with respect to the weight, and a surface H is carried adjacent the other end of the link in sliding engagement with the element. Thus, the effective length of the lever arm afforded by the link is increased as a result of such displacement and movement.

The weight A is carried by the support B, and is provided with a cover 10. The skid control device is illustrated in FIG. 1 as being positioned adjacent the rear bumper 11 of an automobile upon the floor-board 12 of the luggage compartment. Suitable fastening means, such as bolts 13 pass through holes 14 in outwardly projecting flange portions 15 of the base B. The flange or mounting portions 15 may be replaced with brackets (not shown) carried adjacent the upper end portions of the cover 10 for suspending the skid control device beneath the floor 12 as described.

The cover 10 is constructed from a substantially U-shaped middle portion 10a and separate end portions 10b. The end portions 10b have inturned flanges which are secured as by rivets 10c to the U-shaped portion 10a.

The base support B has an intermediate portion 16 between the projecting flanges 15 which carry upturned longitudinal flanges 17 thereon. The cover 10 is attached to the flanges 17 as by rivets 18. The cam means C includes cams 19 and cam followers 20. It will be noted by reference to FIGS. 2 and 3 that a pair of cam followers are carried opposite each other at each end of the skid control device, secured to the upturned flanges 17 as by rivets 21.

Each cam 19 has a raised central portion 19a with a trough 19b on each side thereof. It will be noted that the troughs 19b rise sharply adjacent each outer end thereof, imparting an abrupt stop to the weight when in extreme positions to one side or the other. The raised central portion reaches its highest point in the central portion thereof, which is the equilibrium position or position with the weight in at rest. This position is assumed when no force is imparted to the weight due to movement of the vehicle. It will be noted that the curve of the cam drops from its high point more precipitously than would a true arc. Spaced opposed pairs of cam followers 20 are carried by a respective axle or shaft 20a carried adjacent the end of the weight A. The shafts 20a, as illustrated in FIG. 3, are carried in resilient mounting 20b extending through a transverse bore in the weight A. Each shaft extends outwardly in butting relation with the adjacent upturned flange 17. The cam followers are press fitted upon ball bearings 20c which are, in turn, press fitted upon the shafts 20a Each ball bearing 20c carries a flange 20d extending on each side of respective cam followers 20 to provide spaces maintaining the weight A in alignment at all times.

Referring now to FIGS. 2 and 4, it will be observed that a vertical link D has a pivotal connection E. The pivotal connection E is formed by a pin 22, which is carried between sides 23 which form a part of a casting which includes a web portion 24 and end abutments 25. The casting is fixed as by screws 26 to the substantially U-shaped brace 27. The link D is normally maintained in an equilibrium position about the pivot E as by the opposed spring means F which are carried by the end abutments 25.

The link D has a bifurcated portion 28 which provides a pair of opposed surfaces H for sliding movement with the element G which is positioned in a transverse bore within the weight A, and which is plugged as by welding as at 29 (FIG. 4).

The opposed spring means F include compression springs 30 which are received on one end within a seat 25a in the end members 25, and on the other end by an adjusting nut 31 which is carried upon the threaded shank 32. The shank is slidable within the end abutments 25, and are urged against the link by the springs. The shank 32 is provided with a full nose radius which is carried within indentations 28a within the link adjacent the pivot E. The adjusting nuts are provided with lock nuts 33. A knob 32a is carried by the shank 32 adjacent the opposite end thereof, on the other side of the end members 25, and a washer 32b is provided for retaining a resilient cushioning member 34 for cushioning the spring action.

The weight A is cast with an opening enlarged as at 35 to accommodate the casting allowing for movement with respect to the end abutments 25, and accommodating the sides 23 thereof. The opening is reduced, as at 36, to accommodate the link D and associated parts. The substantially U-shaped brace 27 has legs with respective free ends fixed with respect to the support flanges 17 as by welding at 37.

It will thus be observed that the cam means may be constructed in any configuration to provide relatively large vertical displacement and horizontal movement for the weight, as well as abrupt stops therefor, thus providing a greater force tending to keep the wheels of the vehicle on the ground.

It will be further observed that as the weight A is displaced to one side or the other in FIG. 2, the element G moves downwardly on the surface H engaged thereby so that the spring means F act against an increased effective length of lever arm afforded by the link D.

While a preferred embodiment of the invention has been described using specific terms, such description is for illustrative purposes only.

What is claimed is:

1. A skid control device for vehicles having a weight mounted for vertical displacement and for horizontal movement transverse to the longitudinal axis of the vehicle comprising, a support for carrying said weight in attachment to the vehicle, cam means including, a cam and a cam follower, one of said cam means having connection to the support and the other of said cam means having connection to the weight, a link, a pivotal connection adjacent one end of said link fixed against vertical displacement and horizontal movement with respect to said support, opposed spring means carried by said support normally urging said link to an equilibrium position, an element carried in fixed position with respect to said weight, and a surface carried adjacent the other end of said link in sliding engagement with said element, whereby the effective length of the lever arm afforded by said link is increased as a result of such displacement and movement.

2. The skid control device set forth in claim 1, wherein said link is positioned adjacent the medial portion of said weight, and wherein a cam is fixed upon each side of said support adjacent each end thereof and a cam follower supported by each cam.

3. The skid control device set forth in claim 2, including, a shaft at each end of said weight supporting respective cam followers for rotation, and a resilient mounting carrying each shaft upon the weight.

4. The skid control device set forth in claim 2, including, a substantially U-shaped brace having legs with respective free ends fixed with respect to said support on each side of said weight, said brace supporting said spring means and said pivotal connection, and said spring means engaging said link adjacent said pivotal connection.

5. A skid control device for vehicles having a weight mounted for vertical displacement and for horizontal movement transverse to the longitudinal axis of the vehicle comprising, a support for carrying said weight in attachment to said vehicle, a link, a pivotal connection adjacent one end of said link fixed against vertical displacement and horizontal movement with respect to said support, opposed spring means carried by said support normally urging said link to an equilibrium position, an element carried in fixed position with respect to said weight, and a surface carried adjacent the other end of said link in sliding engagement with said element, whereby the effective length of the lever arm afforded by said link is increased as a result of such displacement and movement.

References Cited

UNITED STATES PATENTS

| | | | |
|---|---|---|---|
| 1,954,409 | 4/1934 | Hanel | 280—150 |
| 2,635,898 | 8/1951 | Silverman | 280—150 |

BENJAMIN HERSH, Primary Examiner

L. J. PAPERNER, Assistant Examiner